(12) United States Patent
Li

(10) Patent No.: US 12,345,531 B2
(45) Date of Patent: Jul. 1, 2025

(54) MAP ESTABLISHMENT METHOD AND MAP ESTABLISHMENT SYSTEM

(71) Applicant: PEGATRON CORPORATION, Taipei (TW)

(72) Inventor: Jun-Ying Li, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 384 days.

(21) Appl. No.: 17/836,830

(22) Filed: Jun. 9, 2022

(65) Prior Publication Data

US 2023/0038297 A1   Feb. 9, 2023

(30) Foreign Application Priority Data

Aug. 5, 2021   (TW) .................... 110128834

(51) Int. Cl.
*G01C 21/00* (2006.01)
*G01C 21/16* (2006.01)
*G06F 16/29* (2019.01)

(52) U.S. Cl.
CPC ....... *G01C 21/1656* (2020.08); *G01C 21/383* (2020.08); *G06F 16/29* (2019.01)

(58) Field of Classification Search
CPC ............... G01C 21/206; G01C 21/383; G01C 21/1656; G06F 16/29
See application file for complete search history.

(56) References Cited

U.S. PATENT DOCUMENTS

| 2021/0190537 A1 | 6/2021 | Gustafsson et al. |
| 2021/0279957 A1* | 9/2021 | Eder ............... G06T 7/80 |

FOREIGN PATENT DOCUMENTS

| CN | 105263113 | 1/2016 |
| CN | 106017476 | 10/2016 |
| CN | 109769206 | 5/2019 |
| CN | 110163264 | 8/2019 |
| CN | 110530371 | 12/2019 |
| TW | 201227604 | 7/2012 |
| TW | 201440013 | 10/2014 |
| WO | 2021104180 | 6/2021 |

OTHER PUBLICATIONS

"Office Action of China Counterpart Application", issued on Dec. 31, 2024, p. 1-p. 7.

* cited by examiner

*Primary Examiner* — Charles J Han
(74) *Attorney, Agent, or Firm* — J.C. PATENTS

(57) ABSTRACT

A map establishment method and a map establishment system are provided. The map establishment method includes: detecting a physical motion performed by a user and generating motion sensing data by at least one motion sensor; obtaining spatial dimension information, in multiple directions, of a target place where the user is located and information of an obstacle in the target place by a deep learning model according to the motion sensing data; and generating map data according to the spatial dimension information and the information of the obstacle, wherein the map data reflects a contour of the target place where the user is located and a distribution status of at least one obstacle in the target place.

12 Claims, 4 Drawing Sheets

MAP ESTABLISHMENT METHOD AND MAP ESTABLISHMENT SYSTEM

CROSS-REFERENCE TO RELATED APPLICATION

This application claims the priority benefit of Taiwan application serial no. 110128834, filed on Aug. 5, 2021. The entirety of the above-mentioned patent application is hereby incorporated by reference herein and made a part of this specification.

BACKGROUND

Technology Field

The disclosure relates to a virtual map establishment technique, and in particular relates to a map establishment method and a map establishment system.

Description of Related Art

In some application fields, a rough contour of the current environment may be automatically generated by spatial detection techniques such as infrared reflection or wireless signal scanning. Although these techniques have been implemented in specific functional electronic devices, such as cleaning robots, these techniques are not suitable for implementation in mobile devices such as users' mobile phones. In practice, when an indoor map needs to be drawn for a specific purpose (for example, interior decoration), it is often necessary to perform a complex measurement to complete the indoor map drawing.

SUMMARY

The disclosure provides a map establishment method and a map establishment system, which may effectively simplify the drawing process of indoor maps.

A map establishment method of an embodiment of the disclosure is provided hereafter. A physical motion performed by a user is detected and motion sensing data is generated by at least one motion sensor. Spatial dimension information, in multiple directions, of a target place where the user is located and information of at least one obstacle in the target place is obtained by at least one deep learning model according to the motion sensing data. Map data is generated according to the spatial dimension information and the information of the at least one obstacle. The map data reflects a contour of the target place and a distribution status of the at least one obstacle in the target place.

An embodiment of the disclosure further provides a map establishment system, which includes at least one motion sensor, a storage circuit, and a processor. The at least one motion sensor is configured to detect a physical motion performed by a user and to generate motion sensing data. The storage circuit is configured to store a deep learning model. The processor is coupled to the at least one motion sensor and the storage circuit. The processor is configured to operate the deep learning model to obtain the spatial dimension information, in multiple directions, of a target place where the user is located and information of at least one obstacle in the target place according to the motion sensing data. The processor is further configured to generate map data according to the spatial dimension information and the information of the at least one obstacle. The map data reflects a contour of the target place and a distribution status of the at least one obstacle in the target place.

Based on the above, after the motion sensor detects the physical motion performed by the user and generates motion sensing data, the deep learning model may establish map data according to the motion sensing data. In particular, the map data may reflect the contour of the target place where the user is located and the distribution status of at least one obstacle in the target place. In this way, the drawing process of an indoor map may be effectively simplified.

DETAILED DESCRIPTION

Figure 1:
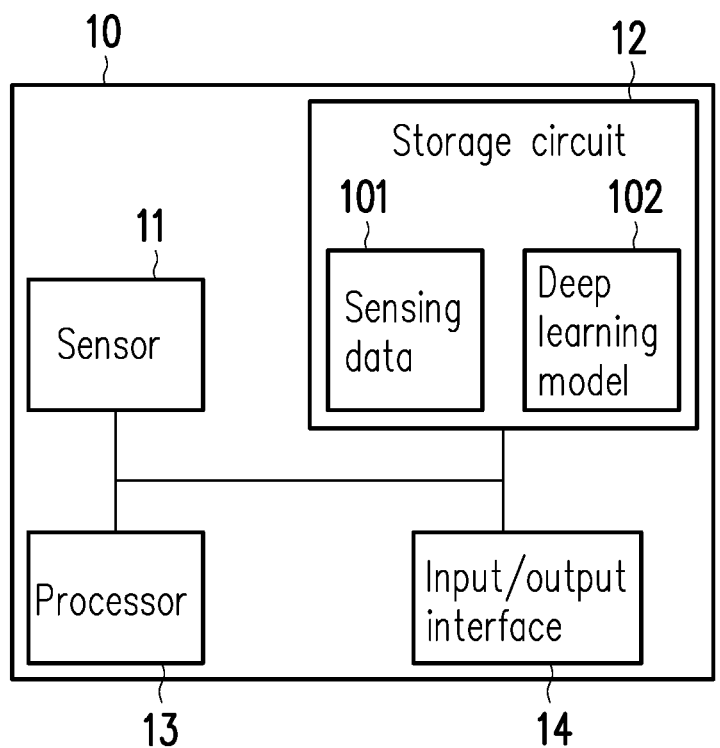
FIG. 1 is a schematic diagram of a map establishment system according to an embodiment of the disclosure.

FIG. 1 is a schematic diagram of a map establishment system according to an embodiment of the disclosure. Referring to FIG. 1, a map establishment system (or a map rendering system) may be implemented in the mobile device 10. For example, the mobile device 10 may be various portable electronic devices such as a smart phone, a tablet computer, a head-mounted display, or a gaming console. The mobile device 10 may include a sensor 11, a storage circuit 12, a processor 13, and an input/output (I/O) interface 14.

The sensor 11 is also called a motion sensor or a movement sensor. The sensor 11 may be configured to sense a physical motion performed by a user holding or carrying the mobile device 10 and to generate corresponding sensing data (also referred to as motion sensing data) 101. For example, the physical motion may include a behavior of the user moving in any direction along a three-dimensional space (also referred to as a physical motion behavior). For example, the physical motion behavior may include walking, running, jumping, squatting, climbing, turning, or the like. The sensor 11 may sense the physical motion and generate sensing data 101 according to the physical motion. In other words, the generated sensing data 101 may reflect the physical motion. For example, the sensor 11 may include a gyroscope, a magnetic-field sensor, an accelerometer, and the like. The disclosure does not limit the type and the number of the sensor 11.

The storage circuit 12 is configured to store data (for example, the sensing data 101). For example, the storage circuit 12 may include a volatile storage circuit and a non-volatile storage circuit. The volatile storage circuit is configured to volatilely store data. For example, the volatile storage circuit may include random access memory (RAM) or similar volatile storage media. The non-volatile storage circuit is configured to non-volatilely store data. For example, the non-volatile storage circuit may include read only memory (ROM), solid state disk (SSD), and/or conventional hard disk drive (HDD), or similar non-volatile storage media.

The processor 13 is coupled to the sensor 11, the storage circuit 12, and an input/output interface 14. The processor 13 is responsible for the whole or a part of the operation of the mobile device 10. For example, the processor 13 may include a central processing unit (CPU), a graphics processing unit (GPU), or other programmable general-purpose or special-purpose microprocessor, a digital signal processor (DSP), a programmable controller, an application specific integrated circuit (ASIC), a programmable logic device (PLD), or other similar devices, or a combination of these devices.

The input/output interface 14 is configured to input and output signals. For example, the input/output interface 14 may include various signal output/output devices such as a network interface card, a mouse, a keyboard, a screen, a touch screen, a speaker, a microphone, or a power supply. The disclosure does not limit the type and number of the input/output interface 14.

In one embodiment, the storage circuit 12 may be configured to store a deep learning model 102. The deep learning model 102 is also referred to as an artificial intelligence (AI) model or a neural network model. In one embodiment, the deep learning model 102 is stored in the storage circuit 12 in the form of a software module. However, in another embodiment, the deep learning model 102 may also be implemented as a hardware circuit, which is not limited by the disclosure.

In one embodiment, after the sensor 11 senses the physical motion performed by the user holding or carrying the mobile device 10 and generates the corresponding sensing data 101, the processor 13 may operate the deep learning model 102 to generate and establish the map data according to the sensing data 101. For example, after the sensing data 101 is inputted to the deep learning model 102, the deep learning model 102 may analyze the sensing data 101 to obtain data such as the user's posture, motion behavior, motion direction, motion distance, motion speed, and motion path (also known as the physical motion data). The deep learning model 102 may generate the map data according to the physical motion data. In particular, the map data may reflect the contour of the place where the user is currently located (also called a target place) and the distribution status of at least one object (also called an obstacle) in the target place. The deep learning model 102 may be trained to improve the accuracy and/or the precision of the map data generated. In addition, the target place may be indoor or outdoor, which is not limited by the disclosure.

In one embodiment, a sub-model (also referred to as the first sub-model) in the deep learning model 102 may obtain the spatial dimension information of the target place in multiple directions according to the sensing data 101. For example, the directions may include any of the two-dimensional or three-dimensional directions in the physical space. In other words, the first sub-model may evaluate or predict the spatial dimensions of the target place in the multiple directions according to the sensing data 101.

In one embodiment, the first sub-model may obtain the moving distance of the user walking along a certain direction (also referred to as the target direction) along the multiple directions when the user performs the physical motion, according to the sensing data 101. The first sub-model may obtain the spatial dimension (also referred to as the target spatial dimension) information of the target place in the target direction according to the moving distance.

In one embodiment, another sub-model (also referred to as the second sub-model) in the deep learning model 102 may obtain the information of at least one obstacle located at the at least one specific position (also referred to as the target position) in the target place according to the sensing data 101. The target position may be located on or near the motion path of the user when the physical motion is performed. In other words, the second sub-model may evaluate or predict the position of the at least one obstacle in the target place and/or the type of obstacles located at the target position according to the sensing data 101.

In one embodiment, the second sub-model may obtain the type of at least one obstacle encountered by the user when the physical motion is performed, according to the sensing data 101. For example, the type of obstacle may include at least one of a wall, a door, and a threshold. In one embodiment, the second sub-model may obtain the type of obstacles encountered by the user when the physical motion is performed, by analyzing the sensing data 101 (for example, the waveform or data type of the sensing data 101). For example, when the sensing data 101 shows a certain waveform or data type, the second sub-model may determine that a certain type of obstacle (for example, a door) exists in front of or near the user. Later, when the sensing data 101 shows another waveform or another data type, the second sub-model may determine that there is another type of obstacle (for example, a wall) in front of or near the user.

In one embodiment, the processor 13 may generate the map data according to the output of the first sub-model (that is, the spatial dimension information) and the output of the second sub-model (that is, the information of the obstacle). For example, the processor 13 may integrate the spatial dimension information and the information of the obstacle and generate the map data according to the integrated result.

In one embodiment, in the operation of generating the map data, the processor 13 may draw the contour of the target place and add the descriptive information of the detected obstacle into the range of the contour according to the spatial dimension information and the information of the obstacle. For example, the contour of the target place may be enclosed by multiple obstacles (for example, walls), and more types of obstacles (for example, doors, windows, or thresholds) may be added into the range of the contour. The spatial dimension information may be configured to define the dimensions of the contour in different directions, and the descriptive information of the obstacle may reflect or describe the position and/or type of the at least one obstacle in the target place. In this way, the final generated map data may reflect the contour of the target place and the distribution status of at least one obstacle in the target place.

Figure 2:
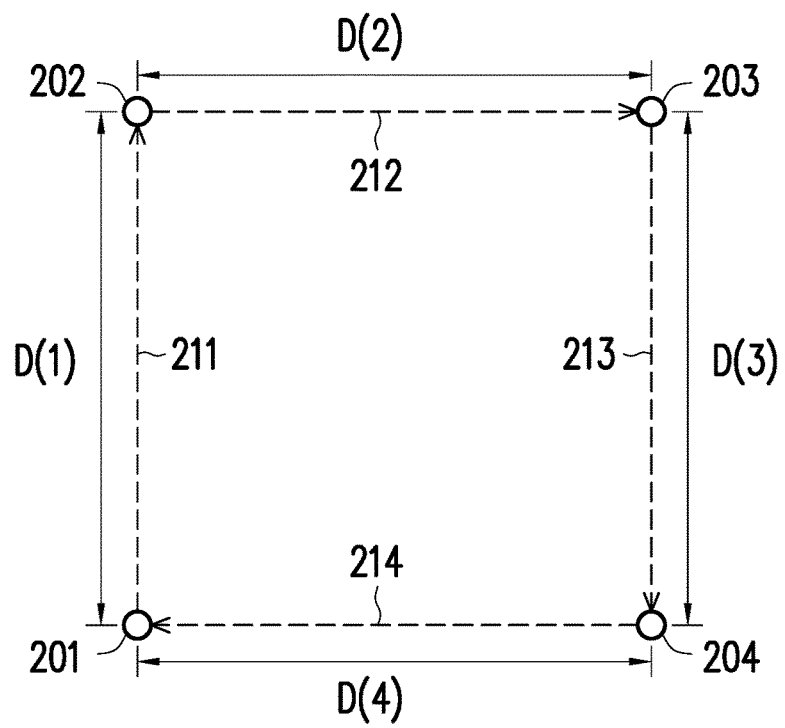
FIG. 2 is a schematic diagram of a map establishment system obtaining spatial dimension information of a target place in multiple directions according to the motion sensing data according to an embodiment of the disclosure.

FIG. 2 is a schematic diagram of obtaining spatial dimension information of a target place in multiple directions according to the motion sensing data according to an embodiment of the disclosure. Referring to FIG. 1 and FIG. 2, it is assumed that the user carries the mobile device 10 of FIG. 1 and performs a physical motion. In this physical motion, the user moves from a position 201 along a direction 211 to a position 202, then the user starts to move from the position 202 along a direction 212 to a position 203, then the user starts to move from a position 203 along a direction 213 to the position 204, then the user starts to move from the position 204 along a direction 214 to the position 201.

The deep learning model 102 (or the first sub-model) may analyze the sensing data 101 and record the user's posture, motion behavior, motion direction, motion distance, motion speed, and motion path when the physical motion is performed. In particular, the deep learning model 102 (or the first sub-model) may evaluate and record the distance value D(1) to distance value D(4) according to the sensing data 101. The distance value D(1) may reflect the motion distance of the user moving from the position 201 along the direction 211 to the position 202. The distance value D(2) may reflect the motion distance of the user moving from the position 202 along the direction 212 to the position 203. The distance value D(3) may reflect the motion distance of the user moving from the position 203 along the direction 213 to the position 204. The distance value D(4) may reflect the motion distance of the user moving from the position 204 along the direction 214 to the position 201. In one embodiment, the spatial dimension information generated by the deep learning model 102 (or the first sub-model) may include distance value D(1) to distance value D(4).

Figure 3:
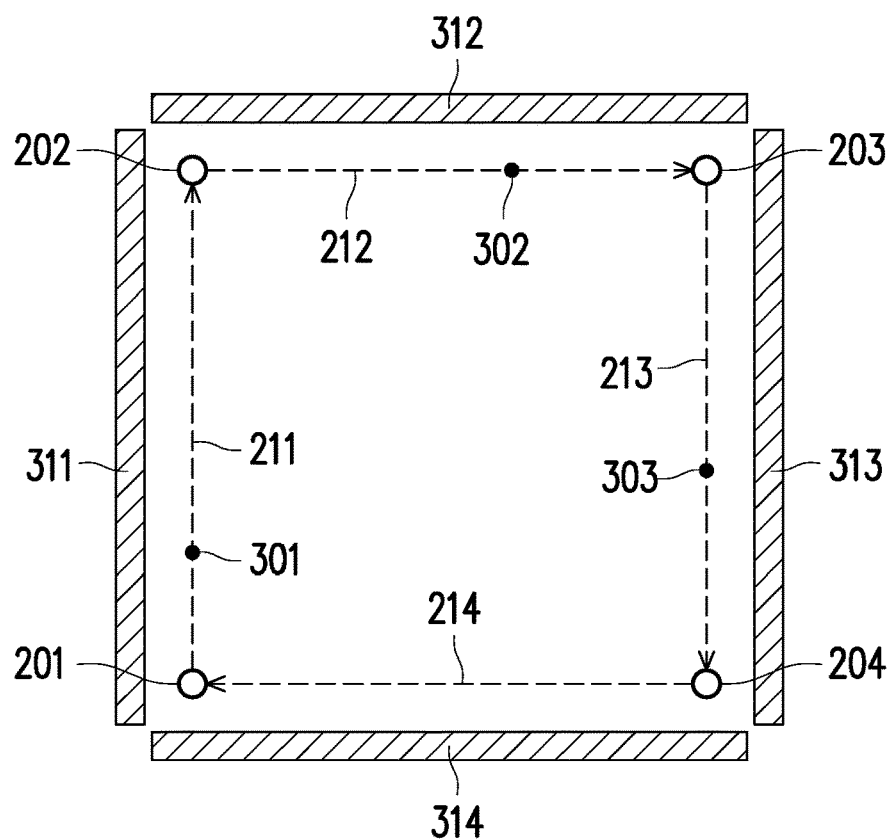
FIG. 3 is a schematic diagram of a map establishment system obtaining information of obstacles located at target positions in a target place according to the motion sensing data according to an embodiment of the disclosure.

FIG. 3 is a schematic diagram of a map establishment system obtaining information of obstacles located at target positions in a target place according to the motion sensing data according to an embodiment of the disclosure. Referring to FIG. 3, following the embodiment of FIG. 2, the deep learning model 102 (or the second sub-model) may analyze the sensing data 101 and obtain the type of at least one obstacle encountered by the user when the physical motion is performed. For example, it is assumed that the user encounters certain types of obstacles at position 301 to position 303. The deep learning model 102 (or the second sub-model) may obtain and record the obstacles encountered by the user at the position 301 to position 303 and the types of these obstacles according to the sensing data 101. In addition, the deep learning model 102 (or the second sub-model) may determine that the user is walking along the inner sides of the walls 311-314 and record information of the obstacle that may describe the positions of the walls 311-314 according to the sensing data 101.

Figure 4:
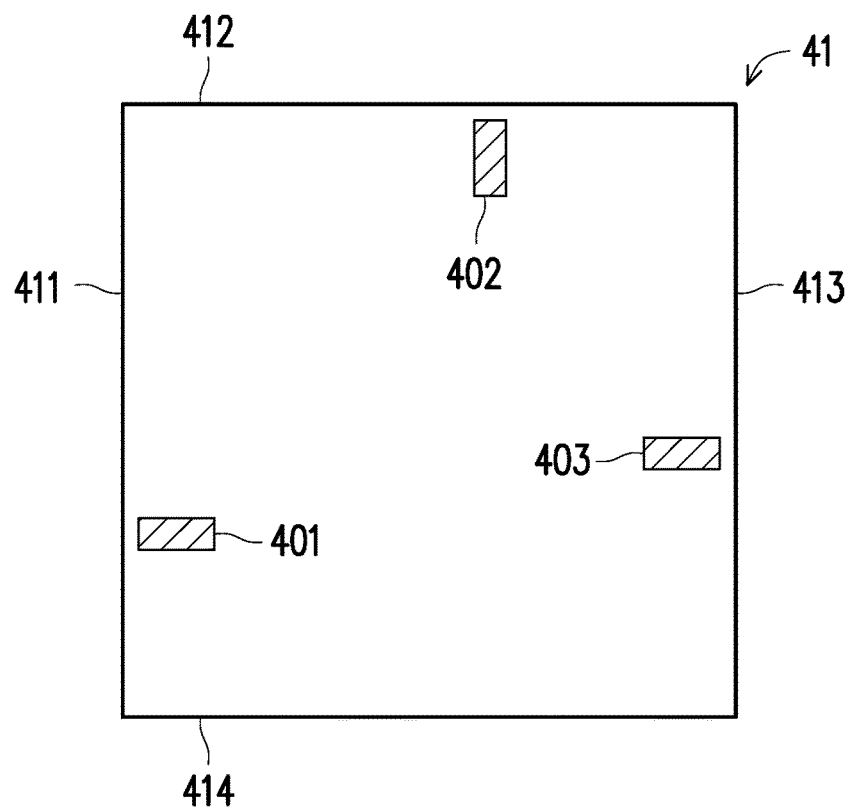
FIG. 4 is a schematic diagram of an indoor map according to an embodiment of the disclosure.

FIG. 4 is a schematic diagram of an indoor map according to an embodiment of the disclosure. Referring to FIG. 4, following the embodiment of FIG. 3, the processor 13 may generate map data corresponding to an indoor map 41 according to the spatial dimension information and the information of the obstacle. For example, the map data may reflect that in the indoor map 41, the walls 41 414 enclose the contour of a closed area, and the three doors 401-403 are located at specific positions in the closed area, as shown in FIG. 4. In addition, the indoor map 41 may show the map data in the form of images, as shown in FIG. 4.

It should be noted that FIGS. 2-4 are only simple examples of some embodiments, and are not intended to limit the disclosure. In practice, the physical motion performed by the user may be more complex, and the sensing data 101 reflecting the physical motion may also be configured to draw a more complex indoor map.

Figure 5:
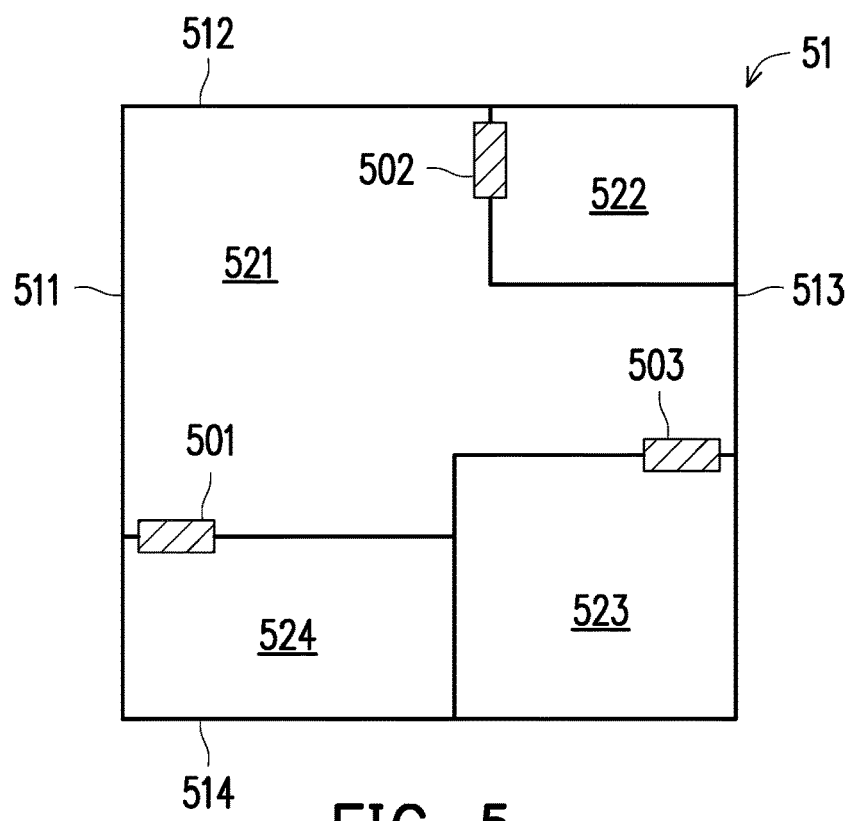
FIG. 5 is a schematic diagram of an indoor map according to an embodiment of the disclosure.

FIG. 5 is a schematic diagram of an indoor map according to an embodiment of the disclosure. Referring to FIG. 5, in one embodiment, the processor 13 may generate map data corresponding to the indoor map 51 according to the spatial dimension information and the information of the obstacle. For example, this map data may reflect that in the indoor map 51, the walls 511-514 encloses a closed area, and the three doors 501-503 and the connected walls divide this closed area into sub-areas 521-524, as shown in FIG. 5.

In one embodiment, the processor 13 may operate the deep learning model 102 to establish the map data according to the sensing data 101 without analyzing the environmental image. That is to say, in an embodiment, in the process of generating the map data, the processor 13 only needs to analyze the sensing data 101, and does not need to refer to any image data that may reflect the environmental image. For example, in one embodiment, when the user carries the mobile device 10 to perform the physical motion, the mobile device 10 may be naturally held by the user or placed in the user's jacket or pants pocket, continuously generating sensing data 101 without using the lens of the mobile device 10 to capture an external environmental image.

In one embodiment, the processor 13 may establish the map data according to the sensing data 101 via the deep learning model 102 without measuring the distance between the user and at least one obstacle. That is to say, in one embodiment, in the process of generating the map data, the processor 13 only needs to analyze the sensing data 101, and does not need to measure or refer to the actual distance between the user and at least one obstacle. For example, in one embodiment, when the user carries the mobile device 10 to perform the physical motion, the mobile device 10 may be naturally held by the user or placed in the user's jacket or pants pocket, continuously generating sensing data 101 without using the lens of the mobile device 10 (for example, an infrared sensor or a depth sensor) to measure the actual distance between the user and at least one obstacle.

In one embodiment, the processor 13 may allow simultaneous reference to the sensing data 101 and additional environmental image in the process of establishing the map data. For example, the environmental image may be obtained by capturing an external image via an image capturing device (that is, a lens) of the mobile device 10. For example, when the user carries the mobile device 10 to perform the physical motion, the mobile device 10 may be held by the user and environmental images of the front and/or other directions may be continuously captured by using the image capturing device of the mobile device 10. Thereafter, the processor 13 may establish the map data according to the sensing data 101 and the environmental image via the deep learning model 102. For example, the environmental image may provide more detailed or accurate data relating to the obstacles the user has encountered during the physical motion. For example, the deep learning model 102 may refer to an environmental image to obtain the position and/or type of obstacles present in this environmental image. The deep learning model 102 may add the descriptive information of the obstacle to the generated map data according to the position and/or type of the obstacle.

In one embodiment, in the training phase, the processor 13 may input the training data into the deep learning model 102 to train the deep learning model 102 to establish a mapping between physical motions performed by different users and the map data generated in correspondence with those different users. Thereafter, in the service phase, the trained deep learning model 102 may generate the map data according to the sensing data 101 and the pre-established mapping. The operational details of generating the map data according to the sensing data 101 have been described in detail above, and is not be repeated here.

In one embodiment, during the training phase, the processor 13 may record motion sensing data generated by multiple users in different ages, genders, weights, and/or heights performing the same or different physical motions. The trained deep learning model 102 may generate corresponding map data and continuously modify and adjust the decision logic of the deep learning model 102 according to this motion sensing data, to continuously improve the accuracy of the map data generated and predicted by the deep learning model 102.

In one embodiment, in the training phase, the processor 13 may correct the sensing result of the sensor 11 (for example, set compensation parameters). Thereafter, in the service phase, the motion sensing data generated by the corrected sensor 11 may more accurately reflect the physical motion.

In one embodiment, during the training phase, the processor 13 may record the stride lengths of different users. For example, in one embodiment, the stride length of a certain user may be directly calculated according to the motion sensing data currently generated. Alternatively, in one embodiment, the stride length of a certain user may be obtained by analyzing an environmental image captured while that user is moving. For example, when a user performs the physical motion, the image capturing device of the mobile device 10 may continue to capture the wall in front of the user (for example, a poster with a two-dimensional code displayed on the wall). The processor 13 may determine the distance between where the user currently is located and the front wall by analyzing the environmental image presenting the two-dimensional code, and then obtain the stride length of the user when the user is moving, according to the analysis result. The stride length may be configured as a part of the training data for training the deep learning model 102.

Figure 6:
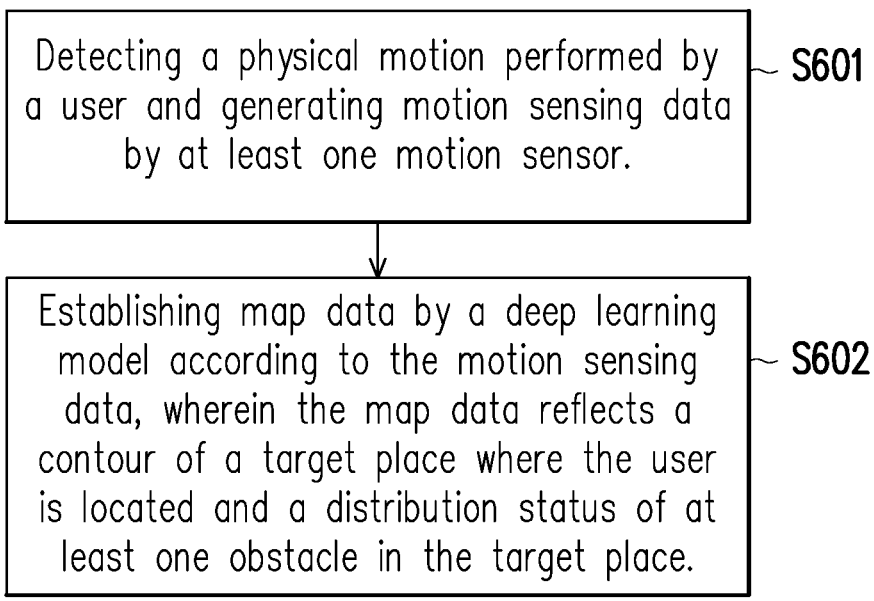
FIG. 6 is a flowchart of a map establishment method according to an embodiment of the disclosure.

FIG. 6 is a flowchart of a map establishment method according to an embodiment of the disclosure. Referring to FIG. 6, in step S601, at least one motion sensor detects the physical motion performed by the user and generates motion sensing data. In step S602, map data is established by the deep learning model according to the motion sensing data. In particular, the map data may reflect the contour of the target place where the user is located and the distribution status of at least one obstacle in the target place.

Figure 7:
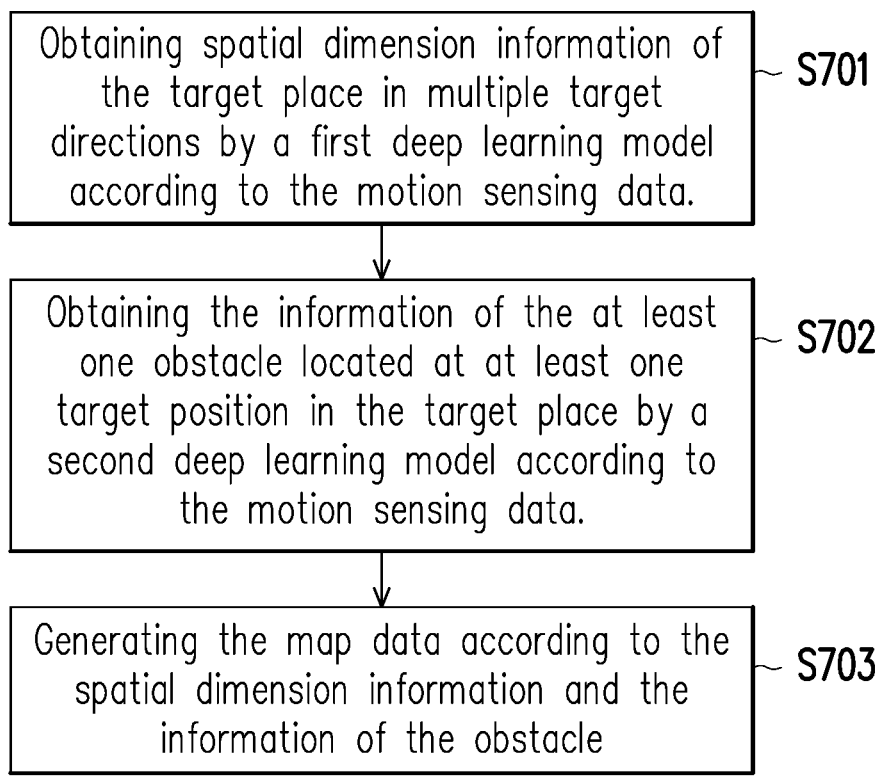
FIG. 7 is a flowchart of a map establishment method according to an embodiment of the disclosure.

FIG. 7 is a flowchart of a map establishment method according to an embodiment of the disclosure. Referring to FIG. 7, in step S701, the first sub-model (also referred to as the first deep learning model) obtains spatial dimension information of the target place in multiple directions (also referred to as the target direction) according to the motion sensing data. In step S702, the second sub-model (also referred to as the second deep learning model) obtains information of at least one obstacle located at at least one target position in the target place according to the motion sensing data. In step S703, the map data is generated according to the spatial dimension information and the information of the obstacle. In one embodiment, step S701 to step S703 may be included in step S602 of FIG. 6.

However, each step in FIG. 7 has been described in detail as the above, and are not repeated herein. It should be noted that each step in FIG. 6 and FIG. 7 may be implemented as multiple codes or circuits, which is not limited by the disclosure. In addition, the methods of FIG. 6 and FIG. 7 may be used in conjunction with the above exemplary embodiments, or may also be used alone, which is not limited by the disclosure.

To sum up, the embodiments of the disclosure may continuously record the motion sensing data generated by the sensor of the mobile device when the user performs the physical motion. Thereafter, the trained deep learning model may quickly establish map data that may reflect the contour of the target place and the distribution status of obstacles in the target place according to the motion sensing data. In this way, the drawing process of an indoor map may be effectively simplified.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A map establishment method, comprising:
   detecting a physical motion performed by a user and generating motion sensing data according to the physical motion detected by at least one motion sensor, wherein the at least one motion sensor comprises a gyroscope and an accelerometer;
   by at least one deep learning model, obtaining spatial dimension information, in a plurality of directions, of a target place where the user is located and information of at least one obstacle in the target place according to the motion sensing data, wherein the at least one deep learning model is an artificial intelligence model or a neural network model operated by a processor;
   by the processor, generating map data according to the spatial dimension information and the information of the at least one obstacle from the motion sensing data without referring to any environmental image captured via an image capturing device, wherein the map data reflects a contour of the target place and a distribution status of the at least one obstacle in the target place; and
   by the processor, displaying a map describing the contour of the target place and the distribution status of the at least one obstacle in the target place according to the map data generated based on the motion sensing data obtained from the gyroscope and the accelerometer, on a display,
   wherein the step of obtaining the spatial dimension information, in the plurality of directions, of the target place where the user is located according to the motion sensing data comprises:
   obtaining a moving distance of the user walking along a target direction among the plurality of directions; and
   obtaining the spatial dimension information of the target place in the target direction according to the moving distance.

2. The map establishment method according to claim 1, wherein the step of obtaining the information of the at least one obstacle in the target place according to the motion sensing data comprises:
   obtaining a type of the at least one obstacle encountered by the user according to the motion sensing data when the physical motion is performed,
   wherein the type of the at least one obstacle comprises at least one of a wall, a door, and a threshold.

3. The map establishment method according to claim 1, wherein the step of generating the map data according to the spatial dimension information and the information of the at least one obstacle comprises:
   drawing the contour of the target place and adding descriptive information of the at least one obstacle into a range of the contour according to the spatial dimension information and the information of the at least one obstacle.

4. The map establishment method according to claim 3, wherein the descriptive information reflects at least one of a position of the at least one obstacle in the target place and a type of the at least one obstacle.

5. The map establishment method according to claim 1, wherein the step of generating the map data according to the spatial dimension information and the information of the at least one obstacle comprises:

generating the map data according to the spatial dimension information, the information of the at least one obstacle, and the environmental image.

6. The map establishment method according to claim 1, further comprising:
inputting training data into the at least one deep learning model in a training phase and establishing a mapping between physical motions performed by different users and map data generated correspondingly.

7. A map establishment system, comprising:
at least one motion sensor, configured to detect a physical motion performed by a user and to generate motion sensing data according to the physical motion, wherein the at least one motion sensor comprises a gyroscope and an accelerometer;
a storage circuit, configured to store at least one deep learning model; and
a processor, coupled to the at least one motion sensor and the storage circuit,
wherein the processor is configured to:
operate the at least one deep learning model and obtain spatial dimension information, in a plurality of directions, of a target place where the user is located and information of at least one obstacle in the target place according to the motion sensing data, wherein the at least one deep learning model is an artificial intelligence model or a neural network model operated by the processor;
generate map data according to the spatial dimension information and the information of the at least one obstacle from the motion sensing data without referring to any environmental image captured via an image capturing device, and the map data reflects a contour of the target place and a distribution status of the at least one obstacle in the target place;
display a map describing the contour of the target place and the distribution status of the at least one obstacle in the target place according to the map data generated based on the motion sensing data obtained from the gyroscope and the accelerometer, on a display,
wherein the operation of obtaining the spatial dimension information, in the plurality of directions, of the target place where the user is located according to the motion sensing data comprises:
obtaining a moving distance of the user walking along a target direction among the plurality of directions; and
obtaining the spatial dimension information of the target place in the target direction according to the moving distance.

8. The map establishment system according to claim 7, wherein the operation of obtaining the information of the at least one obstacle in the target place according to the motion sensing data comprises:
obtaining a type of the at least one obstacle encountered by the user according to the motion sensing data when the physical motion is performed,
wherein the type of the at least one obstacle comprises at least one of a wall, a door, and a threshold.

9. The map establishment system according to claim 7, wherein the operation of generating the map data according to the spatial dimension information and the information of the at least one obstacle comprises:
drawing the contour of the target place and adding descriptive information of the at least one obstacle into a range of the contour according to the spatial dimension information and the information of the at least one obstacle.

10. The map establishment system according to claim 9, wherein the descriptive information reflects at least one of a position of the at least one obstacle in the target place and a type of the at least one obstacle.

11. The map establishment system according to claim 7, wherein the operation of generating the map data according to the spatial dimension information and the information of the at least one obstacle comprises:
generating the map data according to the spatial dimension information, the information of the at least one obstacle, and the environmental image.

12. The map establishment system according to claim 7, wherein the processor is further configured to input training data into the at least one deep learning model in a training phase and establish a mapping between physical motions performed by different users and map data generated correspondingly.

* * * * *